US010551630B2

(12) United States Patent
Sato et al.

(10) Patent No.: US 10,551,630 B2
(45) Date of Patent: Feb. 4, 2020

(54) DISPLAY APPARATUS FOR MOTOR VEHICLE

(71) Applicant: Yazaki Corporation, Tokyo (JP)

(72) Inventors: Gosei Sato, Makinohara (JP); Kiyokazu Yoneyama, Makinohara (JP); Yoshiharu Matsuo, Makinohara (JP)

(73) Assignee: Yazaki Corporation, Tokyo (JP)

( * ) Notice: Subject to any disclaimer, the term of this patent is extended or adjusted under 35 U.S.C. 154(b) by 455 days.

(21) Appl. No.: 14/970,996

(22) Filed: Dec. 16, 2015

(65) Prior Publication Data
US 2016/0178919 A1 Jun. 23, 2016

(30) Foreign Application Priority Data

Dec. 17, 2014 (JP) ................................. 2014-254978
Dec. 17, 2014 (JP) ................................. 2014-254979

(51) Int. Cl.
G02B 27/22 (2018.01)
G02B 27/01 (2006.01)
(Continued)

(52) U.S. Cl.
CPC .......... *G02B 27/2228* (2013.01); *B60K 35/00* (2013.01); *B60K 37/02* (2013.01);
(Continued)

(58) Field of Classification Search
CPC ............ G02B 27/2228; G02B 27/0101; G02B 2027/0134; G02B 27/014; G02B 27/0141;
(Continued)

(56) References Cited

U.S. PATENT DOCUMENTS

2006/0092001 A1 5/2006 Yokota et al.
2006/0092098 A1 5/2006 Yokota et al.

FOREIGN PATENT DOCUMENTS

DE 100 58 527 A1 5/2002
DE 10 2006 032 117 A1 1/2008
(Continued)

OTHER PUBLICATIONS

Notification of Reasons for Refusal drafted Jul. 5, 2016, issued for the Japanese patent application No. 2014-254979 and English translation thereof.
(Continued)

Primary Examiner — Stephone B Allen
Assistant Examiner — Jyotsna V Dabbi
(74) Attorney, Agent, or Firm — Locke Lord LLP

(57) ABSTRACT

A display apparatus for motor vehicle capable of enhancing stereoscopic image effect utilizing a simple configuration. Since the front part includes a tilt approaching to an upward side as the front part proceeding to the front side of the motor vehicle, and a stereoscopic image is displayed on a display surface, the image is made visible in combination with the front part when the ring member is positioned at the tilt position. The image is expressed as having a visual depth by not only a mere image but also by the tilted front part so that the stereoscopic image effect is enhanced due to the combination of the front part and the stereoscopic image having a visual depth. Further, the configuration is simplified since the stereoscopic image effect can be enhanced without a need of altering the direction of the display surface.

20 Claims, 9 Drawing Sheets

(51) Int. Cl.
*B60Q 3/78* (2017.01)
*B60Q 3/16* (2017.01)
*B60K 37/02* (2006.01)
*B60K 35/00* (2006.01)

(52) U.S. Cl.
CPC ............... *B60Q 3/16* (2017.02); *B60Q 3/78* (2017.02); *G02B 27/0101* (2013.01); *B60K 2370/00* (2019.05); *B60K 2370/1531* (2019.05); *B60K 2370/20* (2019.05); *B60K 2370/31* (2019.05); *B60K 2370/347* (2019.05); *G02B 2027/014* (2013.01); *G02B 2027/0134* (2013.01); *G02B 2027/0141* (2013.01); *G02B 2027/0165* (2013.01); *H04N 2213/001* (2013.01)

(58) Field of Classification Search
CPC .. G02B 27/0165; G02B 27/0154; B60Q 3/78; B60Q 3/16; B60K 37/00; B60K 35/00; B60K 2350/106; B60K 2350/965; B60K 2350/1072; B60K 2350/2039; B60K 2350/2052; B60K 2350/2069; B60K 2350/352; H04N 2213/001
USPC .................................................. 359/462, 632
See application file for complete search history.

(56) References Cited

FOREIGN PATENT DOCUMENTS

| | | | | |
|---|---|---|---|---|
| JP | 2006-132950 A | | 5/2006 | |
| JP | 2006-132951 A | | 5/2006 | |
| JP | 2006-234442 A | | 9/2006 | |
| JP | 2009-075026 A | | 4/2009 | |
| JP | 200975026 A | * | 4/2009 | ............... G01D 7/00 |
| JP | 2009-282101 A | | 12/2009 | |
| JP | 2011-017723 A | | 1/2011 | |
| JP | 2011-017723 A | | 1/2011 | |
| JP | 2013-137283 A | | 7/2013 | |
| JP | 2013-147196 A | | 8/2013 | |
| JP | 2013-156219 A | | 8/2013 | |
| JP | 2014-115223 A | | 6/2014 | |
| JP | 2014115223 A | * | 6/2014 | ............... G01D 7/00 |
| JP | 2014228391 A | * | 12/2014 | ............... G01D 7/00 |

OTHER PUBLICATIONS

Notification of Reasons for Refusal drafted Jan. 12, 2017, issued for the Japanese patent application No. 2014-254979.
Notification of Reasons for Refusal drafted Jan. 13, 2017, issued for the Japanese patent application No. 2014-254978.
Office Action prepared Mar. 6, 2017, issued for the corresponding German patent application No. 10 2015 225 665.0 and English translation thereof.

* cited by examiner

DISPLAY APPARATUS FOR MOTOR VEHICLE

CROSS-REFERENCE TO RELATED APPLICATION

This application claims the benefit of Japanese Patent Application No. 2014-254978 filed on Dec. 17, 2014 and No. 2014-254979 filed on Dec. 17, 2014 respectively, the entire disclosures of which are incorporated by reference herein.

FIELD

The present invention relates to a display apparatus for motor vehicle, the display apparatus provided in an instrument panel of a motor vehicle.

BACKGROUND

There is provided a display apparatus for motor vehicle, which includes a display device capable of displaying the speed of motor vehicle, the number of rotations of combustion engine, the fuel remaining amount or the temperature of cooling water as images in an instrument panel of a motor vehicle. In such a display apparatus for motor vehicle, the images which are displayed in accordance with the driving state of motor vehicle may be switched, and the images may be displayed in an enhanced manner when necessary, or the images may be combined with the other members so as to improve the visibility and the design thereof.

As for the display apparatus for motor vehicle in which the images and the other members are combined with each other, a display device including a partition member (a decoration member) which surrounds a part of display region of the display device (a display device) has been proposed (e.g., refer to JP 2011-17723 A). In the display apparatus for motor vehicle as described in JP 2011-17723 A, the partition member is formed in an annular shape and is disposed in front of the display device (the passenger side). Further, a part of the display region is made visible through inside of the partition member. When the image of the region surrounded by such a partition member is displayed on the display device such that the image is seen as being moved, the partition member is slidably moved in accordance with the movement of the image so that the design of the display apparatus for motor vehicle is further improved.

SUMMARY

Incidentally, a device structure in which a stereoscopic image is displayed may be designed by displaying the object located closer to the passenger in a larger size and displaying the object located farther to the passenger in a smaller size, or displaying the object located closer to the passenger at the downward side and displaying the object located farther to the passenger at the upward side so as to let the passenger easily grasp the information to be obtained when the interval with respect to the motor vehicle at the front side or the traffic condition or the like at the front side is displayed on the display device. However, since the display surface of the display device is directed to the vehicle-rearward side, the stereoscopic image effect obtained by such an image is therefore deemed to be limited. Further, although the stereoscopic image effect can be enhanced by tilting the display surface, the tilt angle of the entire display must be altered when attempting to switch the stereoscopic image to the planar image, and vice versa, so that the configuration thereof is rendered to be complicated.

The present invention aims to provide a display apparatus for motor vehicle capable of enhancing stereoscopic image effect utilizing a simple configuration.

Solution to Problem

In order to attain the objectives, one aspect of the present invention provides a display apparatus for motor vehicle provided in an instrument panel of a motor vehicle and displaying an image to a passenger, comprising: a display device configured to be capable of displaying the image toward a vehicle-rearward side; and a decoration member adapted to decorate the image, wherein the decoration member includes a front part capable of being disposed in a tilted manner toward an upward side as proceeding toward the front side of the motor vehicle, wherein an entire or a part of the front part is arranged closer to the vehicle-rearward side than a position of the image in a visual line of the passenger, and wherein the display device is configured to be capable of displaying a stereoscopic image at an upper region of the entire or the part of the front part arranged closer to the vehicle-rearward side than the position of the image.

A first preferred aspect of the present invention provides the display apparatus for motor vehicle according to the one aspect of the present invention, wherein the decoration member is provided in a manner that the tilt angle is made variable between an upright position where the front part is directed to the vehicle-rearward side and a tilt position where the front part is tilted toward the upward side as the front part proceeds toward the front side of the motor vehicle.

A second preferred aspect of the present invention provides the display apparatus for motor vehicle according to the one aspect or the first preferred aspect of the present invention, wherein the front part is arrangeably provided in a manner having the same tilt angle as the tilt angle with respect to a vertical direction expressed by the stereoscopic image.

A third preferred aspect of the present invention provides the display apparatus for motor vehicle according to any one of the one aspect to the second preferred aspect of the present invention, wherein the display device is arranged closer to the front side of the motor vehicle than the decoration member and includes display surface facing the vehicle-rearward side.

A fourth preferred aspect of the present invention provides the display apparatus for motor vehicle according to any one of the one aspect to the second preferred aspect of the present invention, wherein the display device includes a display surface directed to a downward side, further comprising: a reflection member provided closer to the vehicle-rearward side than the decoration member and reflecting the image displayed on the display surface toward the vehicle-rearward side and passing therethrough a light that comes from the front side of the motor vehicle; and a light-emitting section that illuminates the decoration member at a position closer to the front side of the motor vehicle than the reflection member, A fifth preferred aspect of the present invention provides the display apparatus for motor vehicle according to the fourth preferred aspect of the present invention, further comprising a controller that switches a light state where the decoration member is made visible and a dark state where the decoration member is made invisible by switching the light-emitting section in accordance with the image displayed by the display device.

A the sixth preferred aspect of the present invention provides the display apparatus for motor vehicle according to any one of the first preferred aspect to the fifth preferred aspect of the present invention, wherein the decoration member is configured to be moveable in parallel to a width direction of the motor vehicle.

A seventh preferred aspect of the present invention provides the display apparatus for motor vehicle according to any one of the first preferred aspect to the sixth preferred aspect of the present invention, wherein the decoration member is annularly formed so as to surround at least a part of the image displayed and made visible by the display device.

Advantageous Effects of Invention

According to the one aspect of the present invention, since the decoration member includes a front part capable of being disposed in a tilted manner toward an upward side as proceeding toward the front side of the motor vehicle, wherein an entire or a part of the front part is arranged closer to the vehicle-rearward side than the position of the image, and wherein the display device displays a stereoscopic image at an upper region of the entire or the part of the front part being arranged closer to the vehicle-rearward side than the position of the image, the image is made visible in combination with the tilted front part. Accordingly, a visual depth is expressed by not only the image but also by the tiled front part so that a stereoscopic image effect can be enhanced due to the combination of the front part and the stereoscopic image. Further, since the direction of the display surface does not need to be altered, the configuration thereof can be simplified.

According to the first preferred aspect of the present invention, since the decoration member is provided in a manner that the tilt angle is made variable, when a stereoscopic image is made displayed, the decoration member is made positioned and when a planar image is made displayed, the decoration member is made positioned at the upright position so that a clear display image is obtained by effectively combining the image and the decoration member. As a result, the stereoscopic image effect can be further enhanced.

According to the second preferred aspect of the present invention, since the front part is having a tilt angle equivalent to the tilt angle in a vertical direction expressed by the stereoscopic image, the front part and the stereoscopic image can be seen continuous to each other so that the stereoscopic image effect can be further enhanced.

According to the third preferred aspect of the present invention, since the display device includes the display surface directed to the vehicle-rearward side and the actual image displayed on the display surface is therefore seen by the passenger, the image and the decoration member can be made viewable by more effectively combining the both. In this configuration, the display surface is located at the position of the image in the visual line.

According to the fourth preferred aspect of the present invention, since the image displayed on the display surface is reflected to the vehicle-rearward side by the reflection member and the virtual image is seen by the passenger, the virtual image can be made visible in a way overlapped with the decoration member provided closer to the vehicle-front side than the reflection member, variations in expression is enhanced. In this configuration, the virtual image is located at the position of the image in the visual line. Further, the part of the front part can be positioned closer to the vehicle-rearward side than the position of the image.

According to the fifth preferred aspect of the present invention, since a controller that switches a light state where the decoration member is made visible and a dark state where the decoration member is made invisible by switching of ON/OFF of the light-emitting section in accordance with an image displayed by the display device, the image and the decoration member is viewed as in these combination by setting the decoration member to the light state, and solely the image is made visible by setting the decoration member to the dark state. In the configuration in which the decoration member is provided at the vehicle-rearward side of the display surface in the display device, since the decoration member is consistently made to be present on the display surface, the entire region of the display surface cannot be used for the display region, the size of the image capable to be displayed is limited, and the image must be displayed in combination with the decoration member, resulting in the restriction in the variations in expression. In contrast to such a configuration, according to the fifth preferred aspect of the present invention, the entire region on the reflection surface of the reflection member can be utilized as the display region by setting the decoration member to the dark state, an image having larger size can be displayed. Further, the image can be solely displayed, the variations in expression can be increased.

According to the sixth preferred aspect of the present invention, since the decoration member is configured to be moveable in parallel to a width direction of the motor vehicle, the decoration member is moved to appropriate position in accordance with the image to be displayed so that the variations in expression can be further increased.

According to the seventh preferred aspect of the present invention, since the decoration member is annularly formed, the design can be further improved by enhancing the part surrounded by the decoration member.

DETAILED DESCRIPTION

Hereinafter, embodiments of the present invention are described in accordance with drawings. Note that in the second embodiment, a component member having the identical features or functions as the component member in the first embodiment is omitted to be described by marking the same reference number thereto as the former.

<First Embodiment>

Figure 1:
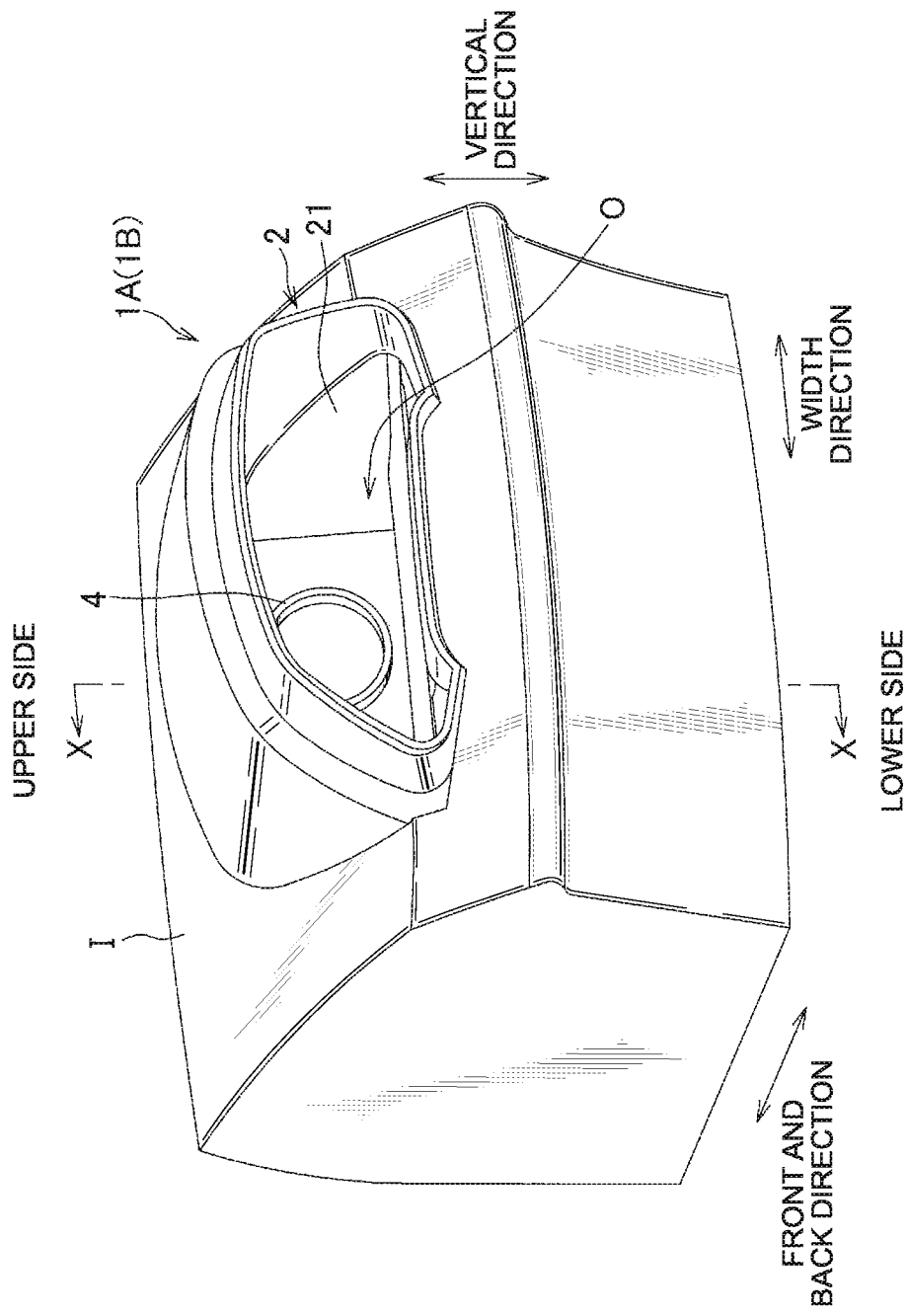
FIG. 1 is a perspective view showing a display apparatus for motor vehicle in embodiments of the present invention.
Figure 2:
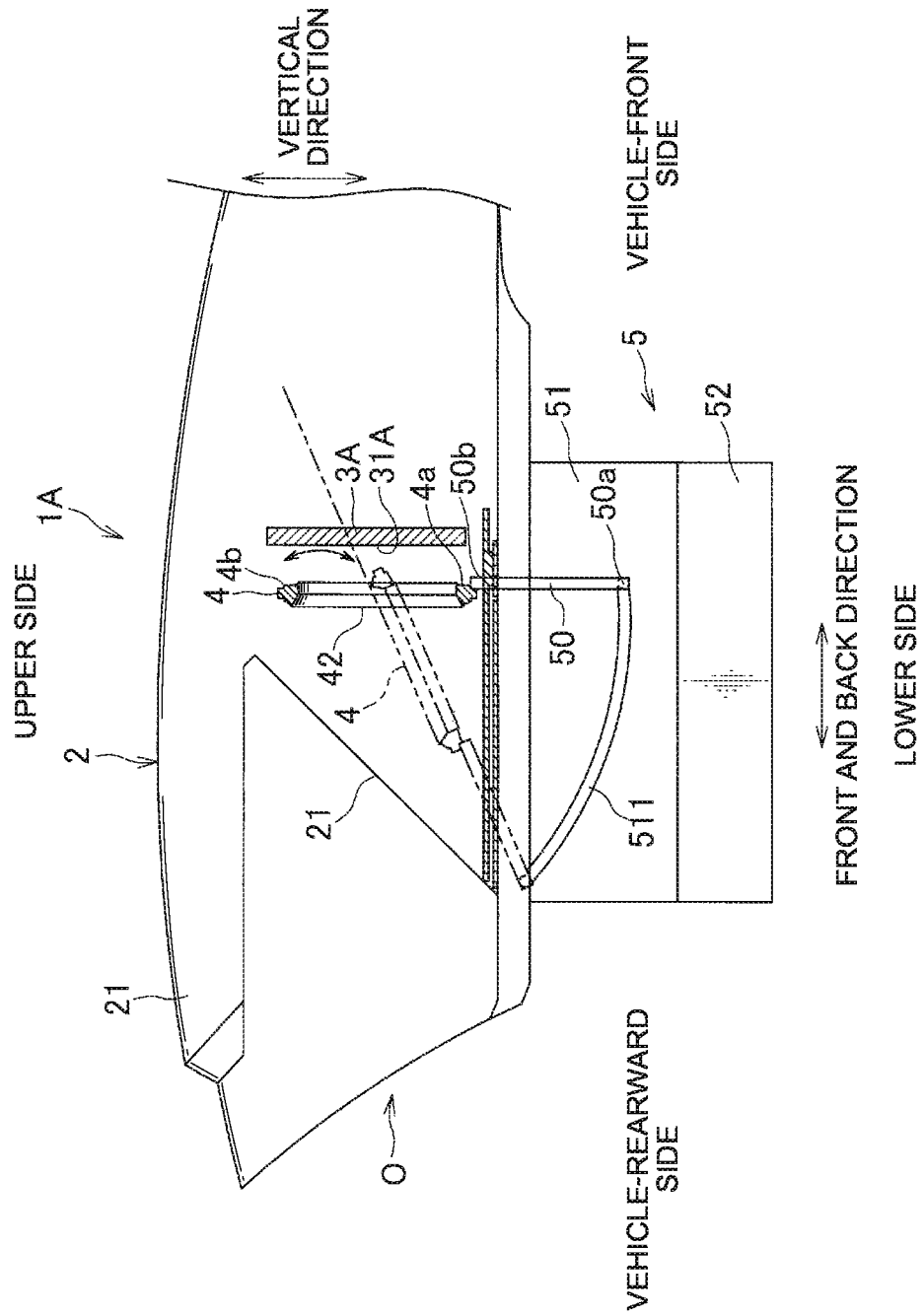
FIG. 2 is a cross-sectional view taken from line X-X in FIG. 1.

A display apparatus for motor vehicle 1A according to the first embodiment is adapted to include, as shown in FIGS. 1 and 2, a case 2 integrally formed with an instrument panel I of a motor vehicle, a display device 3A configured to display images, a ring member 4 as a decoration member, the entire of which being provided closer to the vehicle-rearward side (the passenger side) than the display device 3A, an action mechanism 5 that makes the ring member 4 operate, and a not-shown meter ECU that controls the display device 3A as well as the action mechanism 5. The display apparatus for motor vehicle 1A is provided, for example, in a hybrid vehicle that is driven by a gasoline combustion engine as well as a motor, and is configured to display many kinds of information of the motor vehicle by means of displaying images as shown in FIGS. 4 to 7.

The case 2 is adapted to accommodate the display device 3A and the ring member 4. At the vehicle-rearward side of the case 2, an opening portion O is formed and a cover member 21 being transparent is provided such that the inner side of the case 2 can be seen by the passenger at the vehicle-rearward side through the opening portion O, and the inner side of the case 2 is made protected from water, dust or the like by the cover member 21. The cover member 21 includes a tilt portion that proceeds to the upward side toward the vehicle-front side.

The display device 3A is, for example, a liquid display the entire of which is formed in a plate-like shape, and the display surface 31A that is capable of displaying an image, is installed directed to the vehicle-rearward side. The position of the display surface 31A is located at a position of the image in a visual line. Incidentally, the display device 3A is configured to display stereoscopic images by utilizing disparity by implementing image processing and may be configured to display the second image A2 to the fourth image A4 that will be described later in a stereoscopic manner, or may be configured so as not to implement such an image processing. In this embodiment, the display surface 31A is made extending in the vertical direction, but may be slightly tilted (e.g., approximately 10 degrees) with respect to the vertical direction.

The ring member 4 is annularly formed having a metallic gloss on its surface and is configured to be able to be highly visible by surrounding a part of the display surface 31A. In the outer peripheral portion of the ring member 4, there are formed multiple groove parts 41 having substantially equal intervals therebetween. The lower end 4a of the ring member 4 is supported by the arm part 50 of the action mechanism 5, that will be described later. By the action mechanism 5 that will be described later, the ring member 4 is configured such that the tilt angle with respect to the vertical direction of the motor vehicle is alterable as shown in FIG. 2 and is configured to be moveable in parallel to the width direction of the motor vehicle. Further, the ring member 4 and its front part 42 are consistently arranged closer to the vehicle-rearward side than the display surface 3A even in its operation executed by the action mechanism 5.

The action mechanism 5 includes an arm part 50 that supports the ring member 4, a tilt unit 51 for tilting the ring member 4, and a sliding unit 52 for moving the ring member 4 in parallel motion.

The tilt unit 51 includes a rail portion 511 that guides the arm part 50 and a not-shown first actuator that moves the arm part 50 in a front and back direction. The arm part 50 is configured such that its second end 50b supporting the ring member 4 is moved in the front and back direction due to the guidance for its first end 50a by a rail portion 511 which is arc-shaped, and the entire of the arm part 50 is made tilted with respect to the vertical direction as the second end 50b is moved toward the vehicle-rearward side. The ring member 4 is also made tilted in accordance with the tilting movement of the arm part 50. The ring member 4 is configured such that the second end 50b of the arm part 50 is positioned at vehicle-front side so as to position its front part 42 at an upright position directed to the vehicle-rearward side as indicated by a solid line in FIG. 2. Further, the ring member 4 is configured such that the second end 50b is positioned at the vehicle-rearward side so that the front part 42 is directed to a more upper portion than the upright position as shown by a two-dot chain line, and as the front part 42 is moved to the vehicle-front side, the front part 42 is positioned at a tilt position directed to a more upward side (the front part 42 is tilted forward and upward with respect to the motor vehicle). The ring member 4 is configured such that its tilt-angle is alterable by the tilt unit 51 between the upright position and the tilt position. Further, the lower end 4a of the ring member 4 is moved to the vehicle-rearward side at tilt position and the front part 42 is tilted upwardly so that the ring member 4 is gradually accommodated into the downward of the tilted cover member 21, and the upper end 4b of the ring member 4 is scarcely moved toward the vehicle-front side. In this embodiment, the front part 42 positioned at the upright position is made extended in the vertical direction. Nonetheless, in a case where the display surface 31A is tilted with respect to the vertical direction, the front part 42 positioned at the upright position only have to extend substantially in parallel with the display surface 31A. Further, the front part 42 positioned at the tilt position only have to tilt with respect to the display surface 31.

Figure 3:
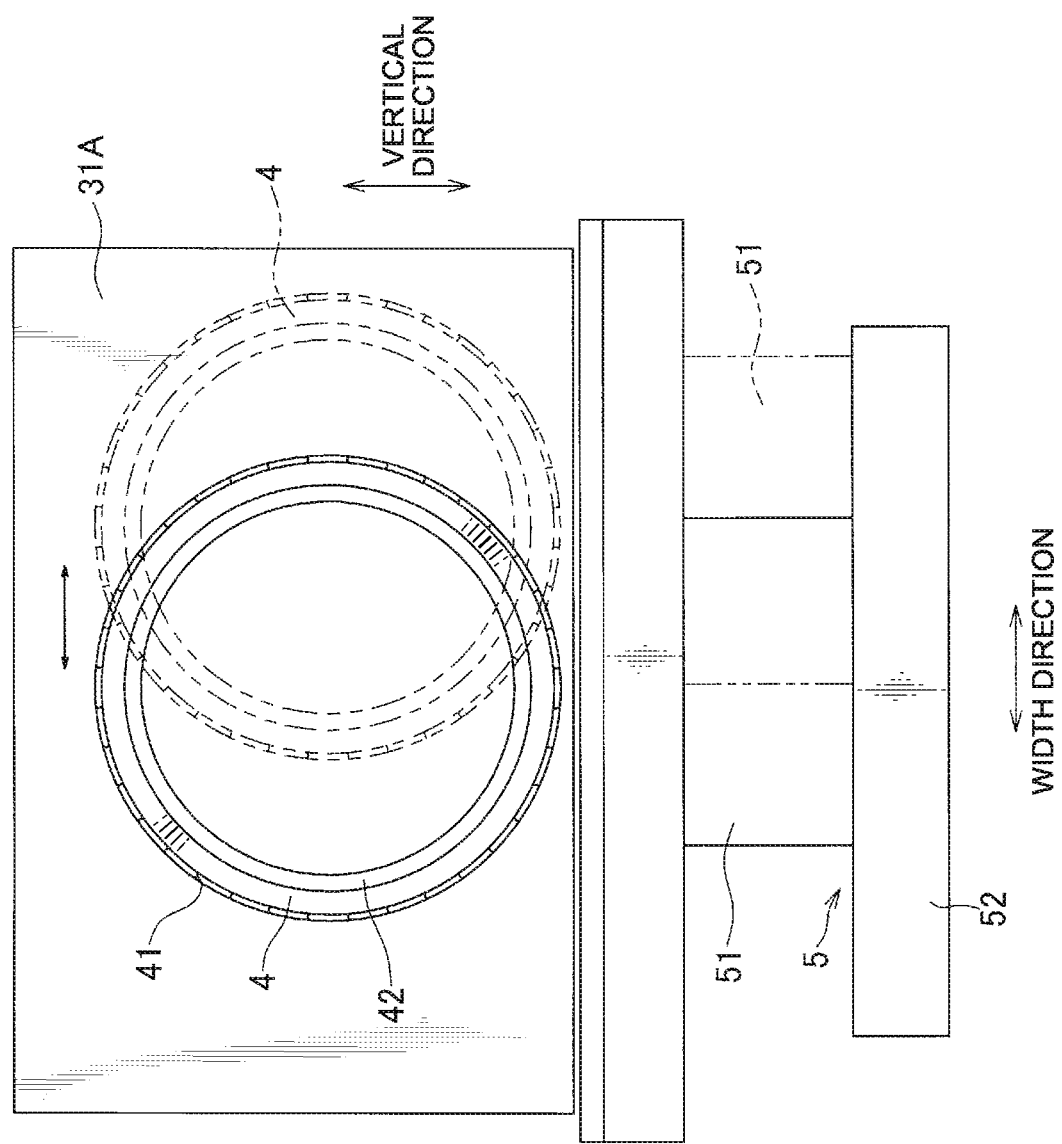
FIG. 3 is a front-elevational view showing main part of the display apparatus for motor vehicle in FIG. 1.

The sliding unit 52 is provided at the downward location with respect to the tilt unit 51 and includes the not-shown second actuator which makes the entire of the tilt unit 51 moved in parallel to the width direction of the motor vehicle. The second actuator operates so as to allow the ring member 4 to move in parallel to the width direction of the motor vehicle as shown in FIG. 3.

Hereinafter, how the combination of the image and the ring member 4 are made visible to the passenger by the meter ECU's control of the display device 3A and the action mechanism 5.

When the planar image is displayed, the meter ECU makes the display surface 31A display the planar image and controls the tilt unit 51 to position the ring member 4 at the upright position and to thereby combine the image and the ring member 4. At this time, in a case where the image to be displayed includes a circular meter for example, the meter is made surrounded by the ring member 4.

When a stereoscopic image is made displayed, the meter ECU controls the tilt unit 51 to make the ring member 4 positioned at the tilt position and to make the stereoscopic image displayed at a region that is located upper than the front part 42 on the display surface 31A so that the image and the ring member 4 are combined. Herein, the stereoscopic image means an image by which the object located closer to the passenger is displayed in a larger size and the object located farther to the passenger is displayed in a smaller size, or the object located closer to the passenger is displayed at the downward side and the object located farther to the passenger is displayed at the upward side. At this time, the tilt angle with respect to the vertical direction expressed by a stereoscopic image and the tilt angle of the front part 42 are made substantially equivalent to each other. That is, the image is displayed in such a manner that the image has a similar visual depth as obtained by the case where a planar image is displayed by disposing the display surface so as to be along the extended surface (shown in two-dot chain line in FIG. 2) from the tilted front part 42.

Further, the meter ECU controls the sliding unit 52 in a case where the planar image or the stereoscopic image are made moved in parallel to the width direction of the motor vehicle on the display surface 31A and the ring member 4 is made moved in parallel in accordance therewith. At this time, the timing when the ring member 4 is made moved may coincide with the timing of the image's movement, or may have some time lags therewith. Further, the ring member 4 only have to be moved in parallel with being positioned at the upright position or at the tilt position in accordance with the image to be displayed.

Hereinafter, concrete examples of the image and d the combination of the image and the ring member 4 that are displayed with the display apparatus for motor vehicle 1A by the displaying method as aforementioned.

Figure 4:
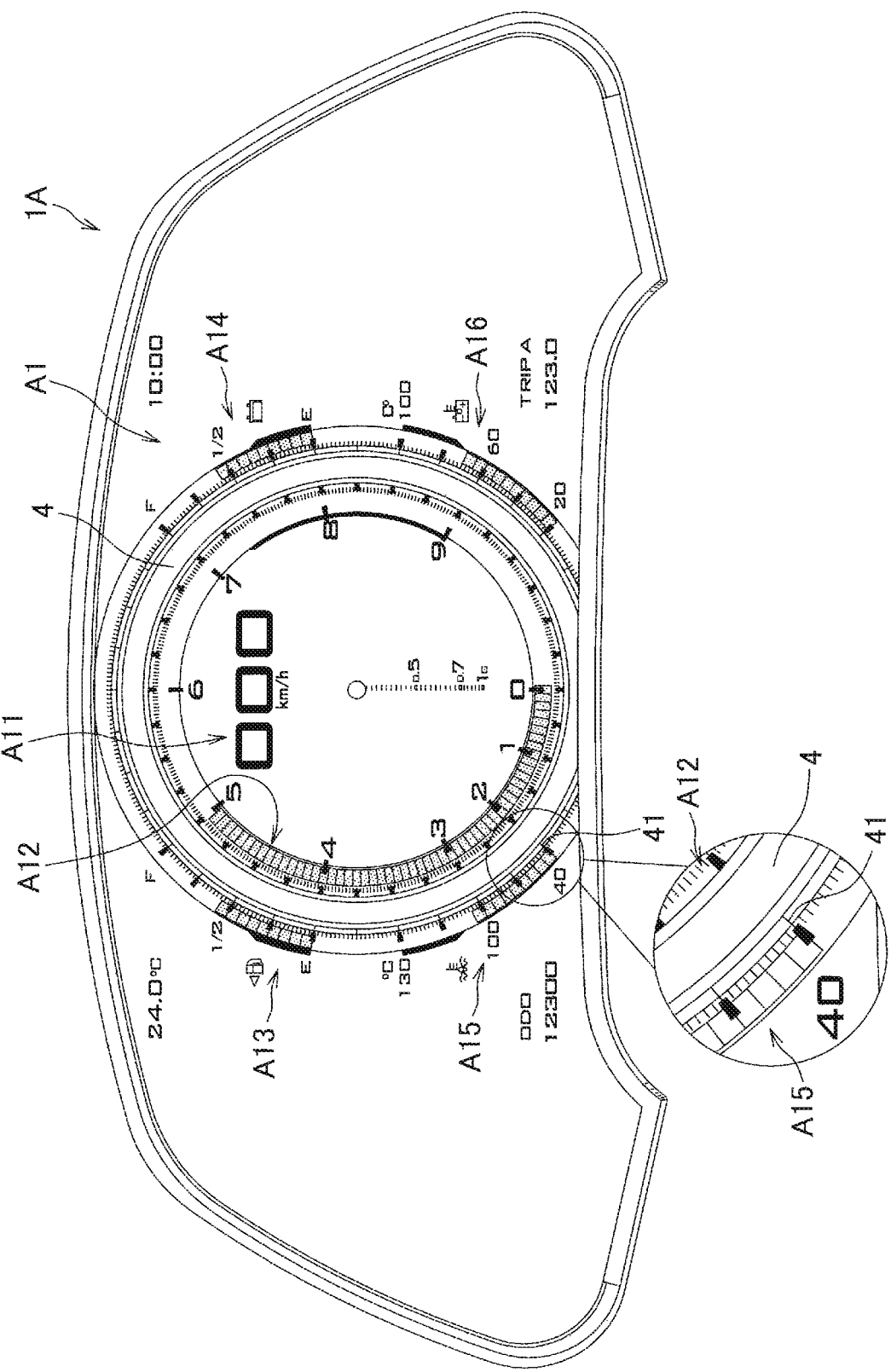
FIG. 4 is a front-elevational view showing one example of an image to be displayed by the display apparatus for motor vehicle in FIG. 1.

When the passenger selects the normal mode, the display apparatus for motor vehicle 1A is made to display the first image A1 shown in FIG. 4. The first image A1 is adapted to include a speed-display portion A11 that displays the speed of the motor vehicle, a rotation number display portion A12 that shows the number of rotations of the combustion engine, a fuel level display portion A13 that shows the fuel remaining amount, a cooling water temperature display portion A15 that indicates the temperature of the cooling water, and a battery temperature display portion A16 that indicates the temperature of the battery. At this time, the ring member 4 is made positioned at the upright position and the fuel level display portion A13, remaining capacity display portion A14, the cooling water temperature display portion A15 and the battery temperature display portion A16 are displayed at regions around the ring member 4, and the multiple groove parts 41 that are formed along the outer periphery of the ring member 4 come to serve as scales for the display portions A13 to A16.

Figure 5:
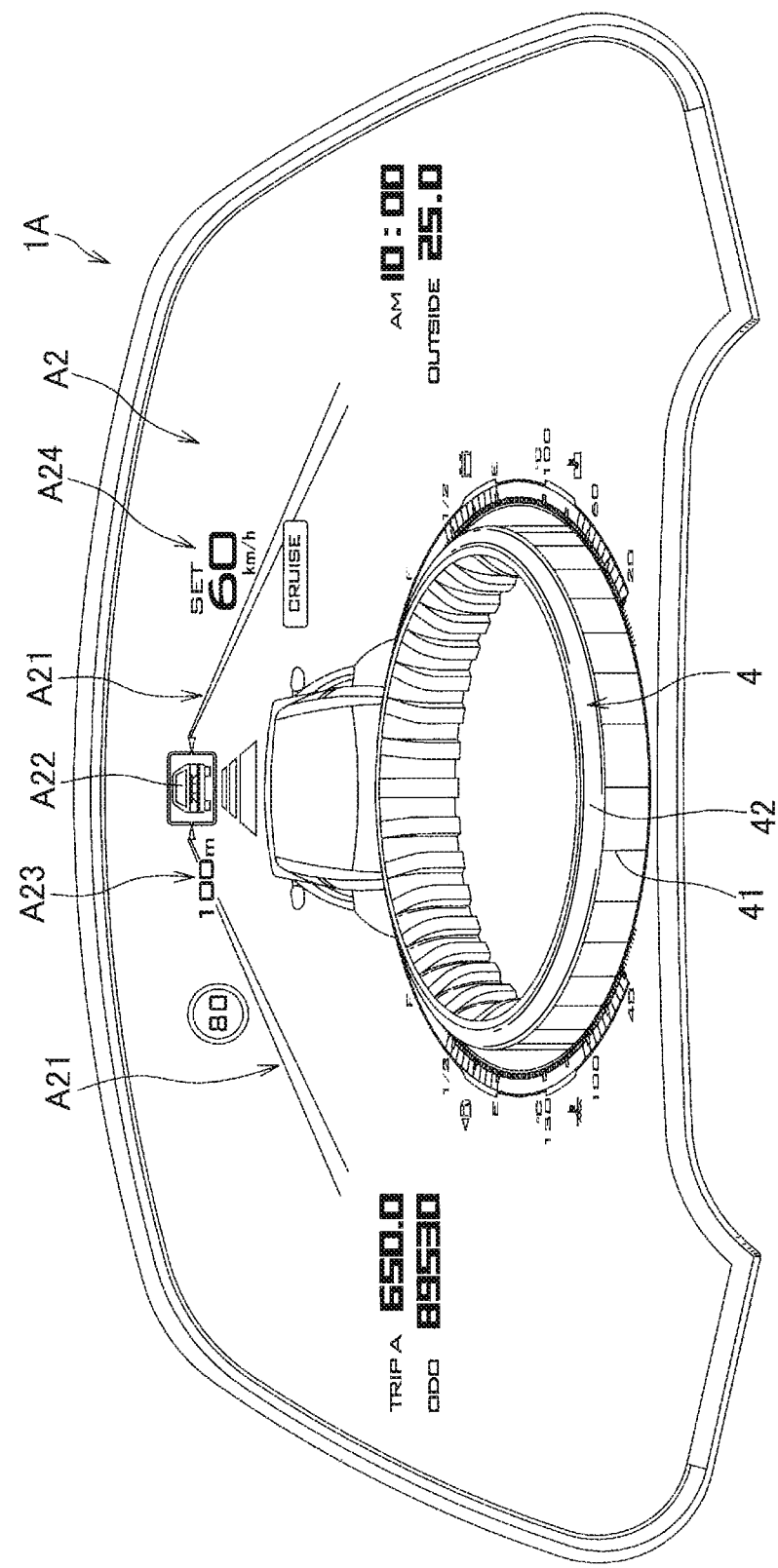
FIG. 5 is a front-elevational view showing another example of the image to be displayed by the display apparatus for motor vehicle in FIG. 1.
Figure 6:
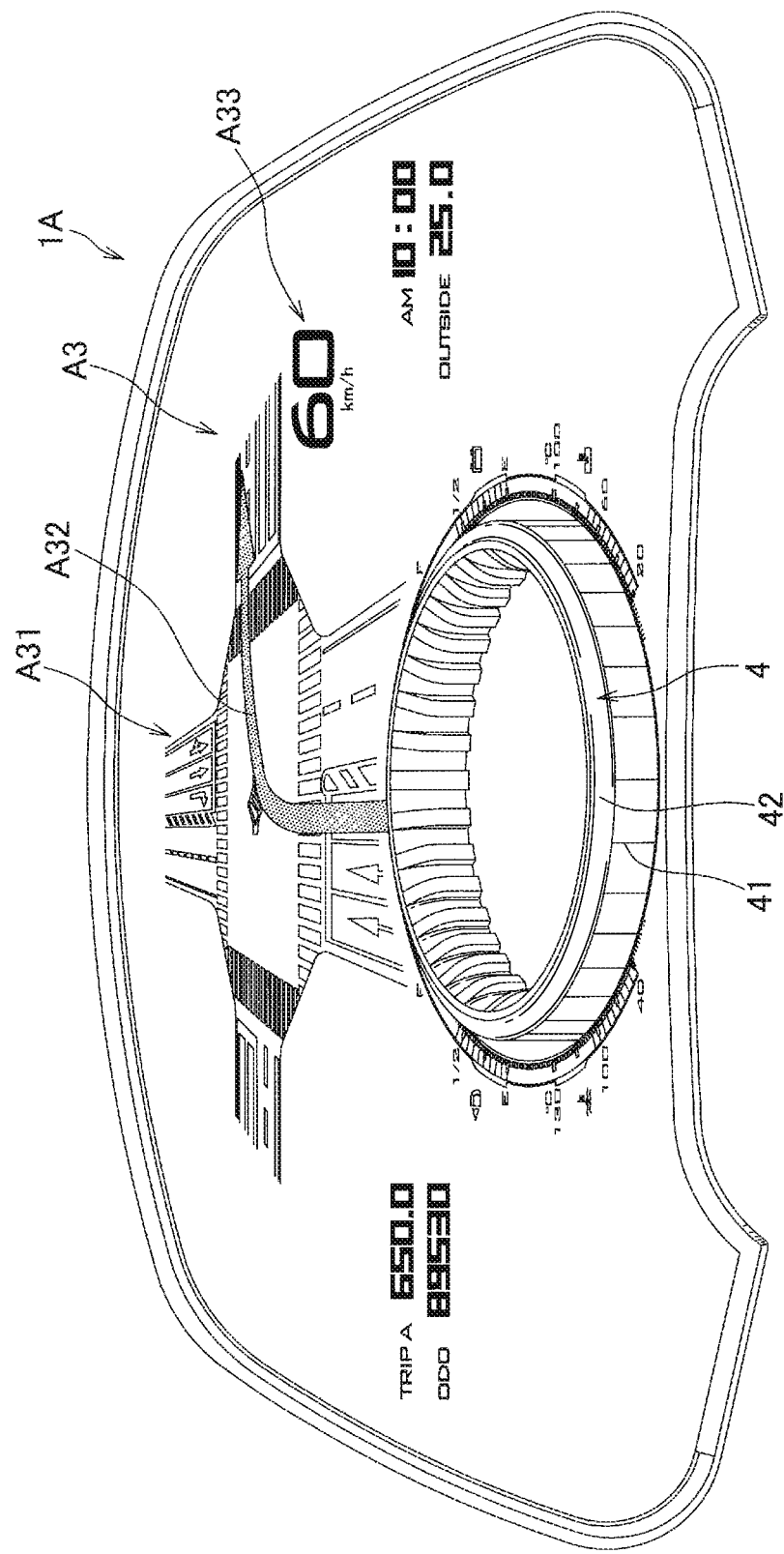
FIG. 6 is a front-elevational view showing still another example of an image to be displayed by the display apparatus for motor vehicle in FIG. 1.

The display apparatus for motor vehicle 1A is adapted to display the second image A2 as shown in FIG. 5 when the vehicle is in a cruising state and the passenger selects cruise mode, and is adapted to display the third image A3 shown in FIG. 6 when guiding the passenger the destination in conjunction with the car navigation system. In either case, the ring member 4 is made positioned at the tilt position. At this time, the timing when the display apparatus for motor vehicle 1A is switched from the first image A1 to the second image A2 or the third image A3 may be substantially concurrent with the timing when the ring member 4 is tilted, or may not be concurrent with each other (one of them may precede to the other). That is, the switching timing of the images and the operation timing of the ring member 4 may either be synchronous or asynchronous. Further, the display device information in each image may be made moveable on the image surface and the tilt angle of the ring member may be altered, and in such cases, the movement timing of the display device information and the operation timing of the ring member 4 may be either synchronous or asynchronous. When the switching timing of the image or the movement timing of the display device information and the operation timing of the ring member 4 are made asynchronous, the dramatic effect by the images can be enhanced.

The second image A2 includes a road traffic situation display portion A21, a front motor vehicle display portion A22, a vehicle interval display portion A23, and a speed-display portion A24. These display portions are displayed at the upper region of the front part 42. The road traffic situation display portion A21 is adapted to display the road shape (linear or curved shape), the regulation speed or the like, and is configured to display the traffic line by narrower width as proceeding from the downward side to the upward side so that the traffic line at a more upward side can be seen at a farther location. At this time, the portion which shows the white line on the either sides of the traffic line is made to be seen as extending in parallel with the line connecting the width end of the ring member 4 and the upper end thereof so that the tilt angle with respect to the vertical direction expressed in a stereoscopic image is made substantially equal to the tilt angle of the front part 42. Further, the front motor vehicle display portion A22 is adapted to display such that when the motor vehicle of the passenger is preceded by the other motor vehicle, the other motor vehicle is made displayed larger and is made displayed at a more downward side as the interval with respect to the other motor vehicle becoming shorter so that the passenger may recognize the other motor vehicle as being located farther as the other motor vehicle approaches to the upward side. The vehicle interval display portion A23 is adapted to display the interval with respect to the other motor vehicle running in front of the passenger's motor vehicle. Incidentally, when no motor vehicles are running in front of the passenger's motor vehicle, the front motor vehicle display portion A22 and the vehicle interval display portion A23 are made invisible.

The third image A3 includes a road-display portion A31, a destination-display portion A32, and a speed-display portion A33. These display portions are displayed at the upper region of the front part 42. The road-display portion A31 is adapted to display how the traffic intersection is shaped and the destination-display portion A32 indicates as to which direction (In FIG. 6, right turn) the motor vehicle is advised to proceed by an arrow. The road-display portion A31 is configured to display the traffic line by narrower width as proceeding from the downward side to the upward side so that when the destination-display portion A32 includes an arrow indicating the upward side, this arrow can be recognized as indicating the front side of the motor vehicle.

Figure 7:
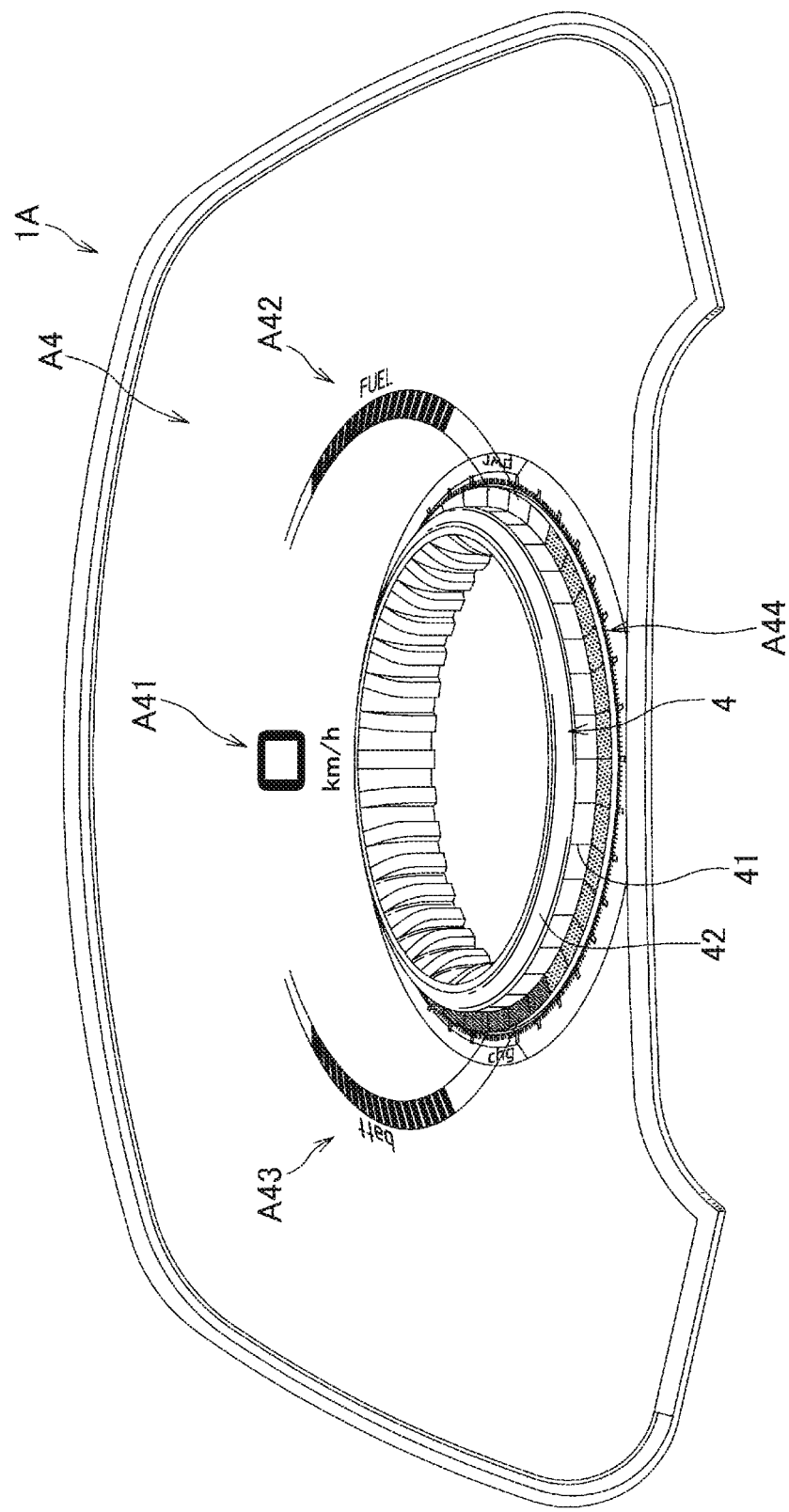
FIG. 7 is a front-elevational view showing still another example of an image to be displayed by the display apparatus for motor vehicle in FIG. 1.

The display apparatus for motor vehicle 1A is adapted to display the fourth image A4 shown in FIG. 7 when the passenger selects the display of economy mode. The fourth image A4 includes a speed-display portion A41 which displays the speed of the motor vehicle, a fuel level display portion A42 which indicates the fuel remaining amount, a remaining capacity display portion A43 which indicates the battery remaining capacity, and a charged/discharged state display portion A44 which indicates the battery's charged/discharged state. The charged/discharged state display portion A44 is formed in annular shape tilting with respect to the front and back direction, and indicates the battery discharged amount becoming greater by lighting toward the right side with respect to the center portion of speed, while indicating the battery charged amount generated by regenerative energy becoming greater by lighting toward the left side. At this time, the ring member 4 is made positioned at the tilt position and charged/discharged state display portion A44 is displayed at the circumference of the ring member 4, and the multiple groove parts 41 that are formed along the outer periphery of the ring member 4 come to serve as scales for the charged/discharged state display portion A44.

According to the first embodiment, the following technical effects are provided, that is, when the ring member 4 is made positioned at the tilt position, the front part 42 has a tilt which is directed to a more upward side as the front part 42 proceeds to vehicle-front side, and a stereoscopic image is shown at the display surface 31A so that the image thereof is made visible in combination with the front part 42. Accordingly, a visual depth is expressed by not only the image but also by the tiled front part 42 so that the stereoscopic image effect can be enhanced due to the combination of the front part 42 and the stereoscopic image. Further, since the direction of the display surface 31A does not need to be altered, the configuration thereof can be simplified.

Further, the ring member 4 is configured such that its tilt-angle is alterable by the tilt unit 51 between the upright position and the tilt position, and when a stereoscopic image is made displayed, the ring member 4 is made positioned at the upright position, and when a planar image is made displayed, the ring member 4 is made positioned at the upright position so that a clear display image is obtained by effectively combining the image and the ring member 4. As a result thereof, the stereoscopic image effect can be further enhanced.

Further, since the tilt angle with respect to the vertical direction expressed by a stereoscopic image and the tilt angle of the front part 42 in the ring member 4 positioned at the tilt position are substantially equivalent, the front part 42 and the stereoscopic image can be seen continuously so that the stereoscopic image effect can be further enhanced.

Further, the display device 3A includes the display surface 31A directed to the vehicle-rearward side and the actual image displayed on the display surface 31A is therefore seen by the passenger, the image and the ring member 4 can be made visible by more effectively combining the both.

Further, since the ring member 4 is made adapted to be parallel movable in the width direction by the sliding unit 52, variations in expression can be increased by transferring the ring member 4 to the appropriate position in accordance with the image to be displayed.

Further, the design can be further improved by enhancing the part of the image surrounded by the ring member 4 formed in an annular shape.

<Second Embodiment>

Figure 8:
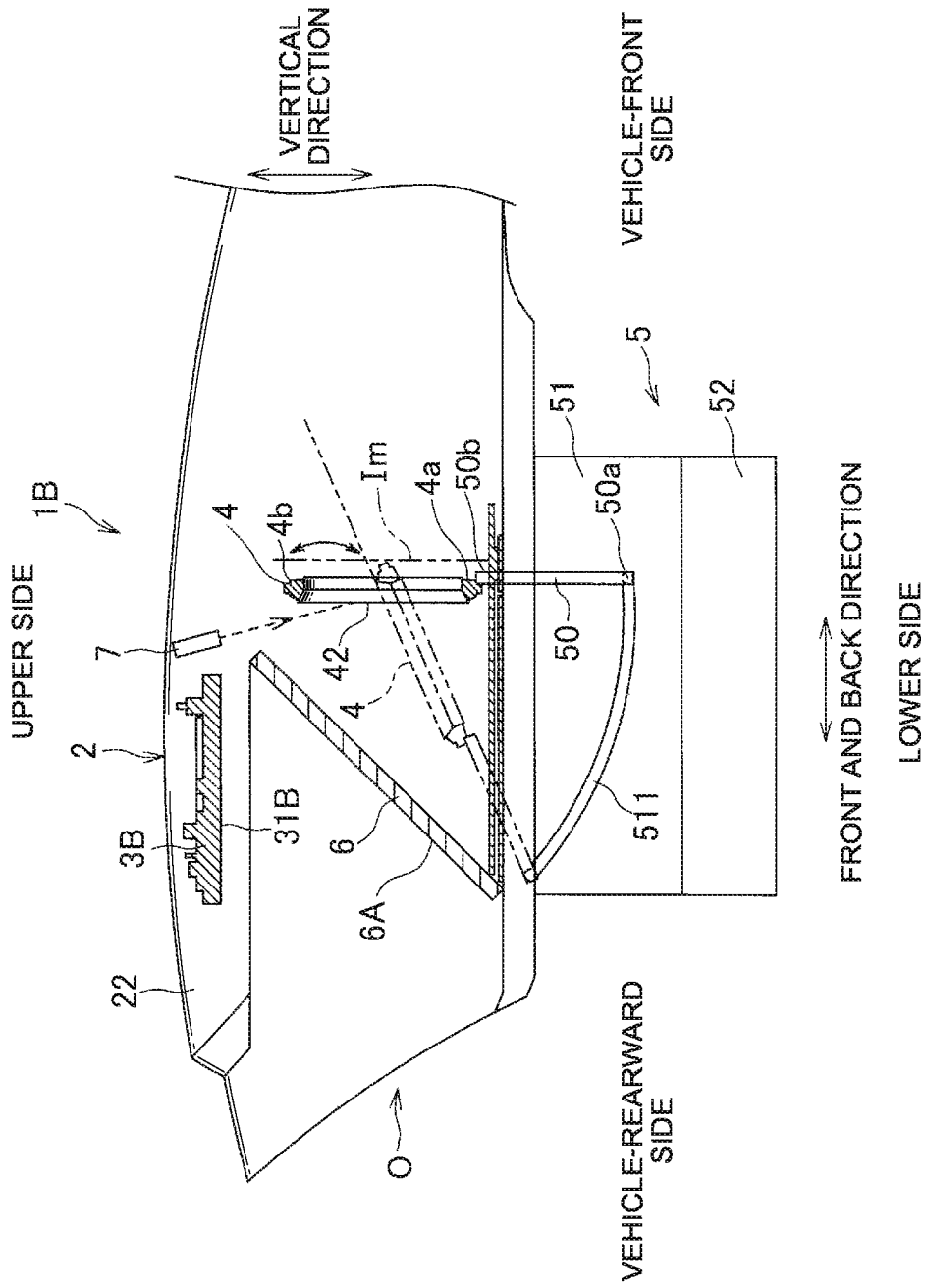
FIG. 8 is a cross-sectional view showing a display apparatus for a motor vehicle according to a variation of the present invention.

A display apparatus for motor vehicle 1A according to the first embodiment is adapted to include, as shown in FIG. 8, a case 2, a display device 3B, a ring member 4, an action mechanism 5, a half mirror (50% beam splitter) 6 as a reflection member which reflects the image displayed by the display device 3B, and an irradiation section 7 which illuminates the ring member 4 at a position closer to the vehicle-front side than the half mirror 6.

The display device 3B is accommodated within the hood part 22 formed in an upper portion of the case 2 and is arranged in a manner directing the display surface 31B to the downward.

The half mirror 6 is formed in a plate-like shape having the upper surface 6A as the reflection surface and is provided at the opening portion O of the case 2 in place of the cover member 21 in the first embodiment. That is, the half mirror 6 is provided at the downward region of the display device 3B as well as at the vehicle-rearward side of the ring member 4, and is tilted toward the upward side as approaching to the vehicle-front side. The image displayed on the display surface 31B that is the lower surface of the display device 3B is reflected by the half mirror 6 toward the vehicle-rearward side so that the passenger is likely to see the image as displayed on the virtual-image plane Im that is located closer to the vehicle-front side rather than to see the image as displayed on the half mirror 6. The virtual-image plane Im is consistently located closer to the vehicle-front side than the ring member 4 and its front part 42. The virtual-image plane Im is made positioned at the image in the visual line. Although the virtual-image plane Im is made extended along the vertical direction in this embodiment, the virtual-image plane Im may be tilted to some extent with respect to the vertical direction as in the case with the display surface 31 in the first embodiment.

The irradiation section 7 includes, for example, an LED element, and the irradiation section 7 is provided at the upper region than the ring member 4 and is configured to emit light toward the ring member 4 from the vehicle-rearward side. Incidentally, the irradiation section 7 shall be affixed to one specific position in this embodiment. The irradiation section 7 may be configured to be altered in the angle of emitting light in accordance with the tilt angle of the ring member 4, or may be provided at multiple locations. The irradiation section 7 is affixed to one specific position so that altering the tilt angle of the ring member 4 causes the change of the portion which is easily illuminated by light, and due to the contrast by light-dark areas within the ring member 4, the stereoscopic image effect can be made dramatic.

Hereinafter, how the image, or the combination of the image and the ring member 4 is made visible to the passenger by the meter ECU's control of the display device 3B, the action mechanism 5, and the irradiation section 7. Incidentally, the background of each image and the overlapping portion between the image and the ring member 4 is set in black color.

When the image is solely displayed to the passenger, the meter ECU makes the display device 3B display the image and makes the irradiation section 7 turned off. At this time, the ring member 4 is rendered to be in the dark state where the light emitted by the irradiation section 7 is not reflected and the light emitted by the ring member 4 is in a very low level, and the light is therefore not recognized by the passenger.

In a case where the image and the ring member 4 are displayed in combination, the meter ECU renders the display device 3B to display the image and to turn on the irradiation section 7. At this time, the ring member 4 is in the light state where the ring member 4 emits light by reflecting the light irradiated by the irradiation section 7, and the reflected light passes through the half mirror 6 and proceeds toward the vehicle-rearward side. Accordingly, the ring member 4 and the image are viewed in combination by the passenger. At this time, the color of the portion which overlaps with the ring member 4 in the images is set to be in black color so that the ring member 4 is not viewed as overlapping with the image, but is viewed in a similar manner as the conventional configuration in which the ring member is provided in the front side of the display device, is displayed. Incidentally, the ring member 4 and the image may be displayed in overlapping with each other by properly displaying at the portion where the image overlaps with the ring member 4. As described above, the irradiation section 7 can be rendered to be in the light state where the ring member 4 is made viewable by lighting up, and therefore serves as the light-emitting section.

Further, the meter ECU is adapted to control the action mechanism 5 in the same manner as the first embodiment in accordance with the image combined with the ring member 4 so as to make the ring member 4 be moved in parallel or to be altered in the tilt angle.

Hereinafter, an image displayed by the display apparatus for motor vehicle 1B in a way as the above described and a concrete example of a combination of the image and the ring member 4, are described.

The display apparatus for motor vehicle 1B is adapted to display an image that is the same as the first to the fourth images A1 to A4 in the first embodiment when the passenger selects the normal mode, the cruise mode, or the economy mode and is adapted to render the ring member 4 to operate.

Figure 9:
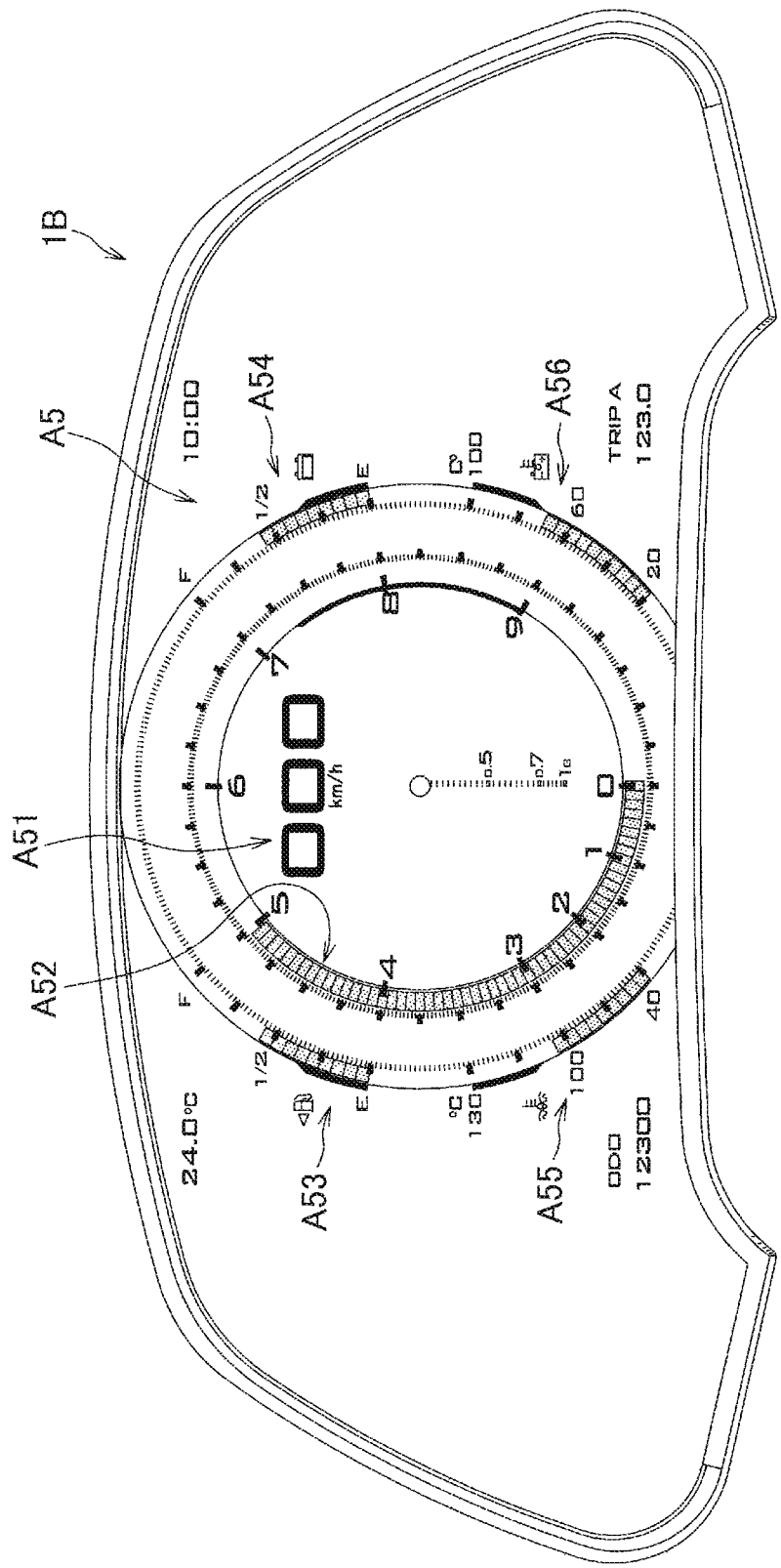
FIG. 9 is a front-elevational view showing one example of an image to be displayed by the display apparatus for motor vehicle in FIG. 8.

The display apparatus for motor vehicle 1B is adapted to display a fifth image A5 shown in FIG. 9 when the passenger selects the sports mode. The fifth image A5 is configured to include a speed-display portion A51 that displays the speed of the motor vehicle, a rotation number display portion A52 that displays the number of rotations of the combustion engine, a fuel level display portion A53 that displays the fuel remaining amount, a remaining capacity display portion A54 that displays remaining capacity of the battery, a cooling water temperature display portion A55 that displays the temperature of cooling water, and a battery temperature display portion A56 that displays the temperature of the battery. At this time, the ring member 4 becomes the dark state and is not viewed by the passenger, and never conceals the fifth image A5.

According to such a second embodiment, the same technical effect as that of the first embodiment can be obtained. Further, since the meter ECU is adapted to switch ON/OFF of the irradiation section 7 so as to switch the light state and the dark state of the ring member 4, the image and the ring member 4 is viewed as in these combination by setting the ring member 4 to the light state, and solely the image is made visible by setting the ring member 4 to the dark state. By setting the ring member 4 to the dark state, the entire region of the reflection surface of half mirror (50% beam splitter) 6 can be utilized as the display region, so that a larger image can be displayed. Furthermore, by solely displaying the image, the variations in expression can be increased.

Incidentally, the present invention is not limited to the first embodiment or the second embodiment, but includes the other configurations or the like that can attain the objectives of the present invention, and the variations or the like shown as follows are within the scope of the present invention.

For example, in the first embodiment, although the ring member 4 is made configured to be alterable in the tilt angle between the upright position and the tilt position by the tilt unit 51, the alterable range of the tilt angle may be set as appropriate. Further, the tilt unit 51 may be omitted and the ring member 4 may be consistently made positioned in the tilt position.

Further, in the first embodiment, although the tilt angle in the vertical direction expressed in the stereoscopic image and the tilt angle of the front part 42 in the ring member 4 that is made positioned at the tilt position are made substantially equivalent to each other, these tilt angles may be different from each other to some extent, insofar as the visual depth expressed by the front part 42 corresponds to the visual depth expressed by the image.

Further, in the second embodiment, although the virtual-image plane Im is consistently made positioned closer to the vehicle-front side than the front part 42 of the ring member 4, the virtual-image plane Im may be made positioned closer to the vehicle-front side than at least a part of the front part 42 in the ring member 4 positioned at the tilt position. That is, it is sufficient that at least a part of the front part 42 is made closer to the vehicle-rearward side than the virtual-image plane Im. According to such a configuration, a part of the ring member 4 may be combined with the image and the variations in expression can be increased.

Further, in the second embodiment, although the irradiation section 7 which irradiates light to the ring member 4 is adapted to serve as the light-emitting section, such a configuration in which the light-emitting member such as LED or the like is provided at the front part of the ring member, and by the lighting-up of the light-emitting member, the ring member is made to emit light and becomes in the light state, and the light-emitting member serves as the light-emitting section, may also be available. According to such a configuration, by the combining the ring member lit-up and the image by the light-emitting member, the variations in expression can be increased. Incidentally, in a case where such a light-emitting member is provided, the light-emitting member and the irradiation section 7 may be lit up in arbitrary combination thereof in accordance with the image to be displayed, or the irradiation section 7 may be omitted.

Further, in the second embodiment, although the meter ECU as the control section is adapted to control the irradiation section 7 so that the light state and the dark state of the ring member 4 are switched to each other, the irradiation section 7 may be configured to light up in an interlocked state with the image displayed by the display device 3B, and the display apparatus for motor vehicle 1B may be configured to solely display the combination of the ring member 4 and the image.

Further, in the first embodiment, although the ring member 4 is provided to be moveable in parallel to the width direction of the motor vehicle, the ring member 4 may be provided immovable in parallel in a case where the image is not moved, or in a case where the ring member 4 does not surround the image after being moved.

Further, in the first embodiment, although the ring member 4 in an annular shape which surrounds a part of the image is exemplified for the decoration member, the decoration member may be enough to be a member enhanced in visibility or a member improved in design by being combined with the image. The decoration member may be the ring member which surrounds the entire periphery of the image, may be formed in a polygonal and annular shape, or may be in any shapes which do not surround the image.

Further, in the first embodiment, although the display apparatus for motor vehicle 1A is adapted to display the first to the fourth images A1 to A4, and is to be combined with the ring member 4, in a case where different images from these images are displayed, the ring member 4 may be positioned at an appropriate width direction position in accordance with the image and may have an appropriate tilt angle.

As the rest, although a configuration, a method, or the like that is considered to be the best has been disclosed in the above descriptions, the present invention is not limited thereto. That is, the present invention is shown in drawings and is described particularly in regard to specified embodiments, a skilled person in the pertinent art is allowed to add various variance thereto such as in shape, material, number or amount, or the other detailed configurations without departing from the inventive concept or the objectives of the present invention. Consequently, since the descriptions in which the shapes or the materials are limited, are exemplified for facilitating the understanding of the present invention, and are not meant to limit the present invention, a description under the names of members by the part of the shapes or the materials, or an exclusion of the entire limits thereof is ought be within the scope of the present invention.

REFERENCE SIGNS LIST 1A, 1B display apparatus for motor vehicle
3A, 3B display device
4 ring member (decoration member)
42 front part
6 half mirror (50% beam splitter) (reflection member)
7 irradiation section (light-emitter)
I instrument panel

The invention claimed is:

1. A display apparatus for motor vehicle provided in an instrument panel of a motor vehicle and displaying an image to a passenger, comprising:
a display device configured to display the image toward a vehicle-rearward side; and
a decoration member configured to decorate the image, wherein the decoration member comprises a front face part,
wherein a tilt angle of the front face part with respect to a vertical direction of the motor vehicle is variable,
wherein the front face part is arranged not to tilt with respect to a width direction of the motor vehicle,
wherein an entire or a part of the front face part is arranged closer to the vehicle-rearward side than a position of the image in a visual line of the passenger, and
wherein the display device is configured to display a stereoscopic image at an upper region of the entire or the part of the front face part arranged closer to the vehicle-rearward side than the position of the image
wherein the display apparatus further comprises a tilt unit configured to vary the tilt angle of the front face part,
wherein the tilt unit includes:
an arm part having a first end that supports the decoration member, and
a rail portion;
wherein a second end of the arm part is configured to be guided by the rail portion in a front-rear direction of the motor vehicle to move the first end of the arm part in the front-rear direction of the motor vehicle, thereby varying the tilt angle of the front face part of the decoration member with respect to the vertical direction of the motor vehicle.

2. The display apparatus for motor vehicle according to claim 1, wherein the decoration member is provided in a manner that the tilt angle is variable between an upright position where the front face part is directed to the vehicle-rearward side and a tilt position where the front face part is tilted toward a front side of the motor vehicle with respect to the upright position.

3. The display apparatus for motor vehicle according to claim 2, wherein the front face part is configured to be tilted with the tilt angle same as a tilt angle with respect to the vertical direction expressed by the stereoscopic image.

4. The display apparatus for motor vehicle according to claim 3, wherein the display device is arranged closer to the front side of the motor vehicle than the decoration member and is comprised of a display surface facing the vehicle-rearward side.

5. The display apparatus for motor vehicle according to claim 3, wherein the display device is comprised of a display surface directed to a downward side, further comprising:
a reflection member provided closer to the vehicle-rearward side than the decoration member and reflecting the image displayed on the display surface toward the vehicle-rearward side and passing therethrough a light that comes from the front side of the motor vehicle; and
a light-emitting section that illuminates the decoration member at a position closer to the front side of the motor vehicle than the reflection member.

6. The display apparatus for motor vehicle according to claim 5, further comprising a controller that switches between a light state where the decoration member is made visible and a dark state where the decoration member is made invisible by switching the light-emitting section in accordance with the image displayed by the display device.

7. The display apparatus for motor vehicle according to claim 2, wherein the display device is arranged closer to the front side of the motor vehicle than the decoration member and is comprised of a display surface facing the vehicle-rearward side.

8. The display apparatus for motor vehicle according to claim 2, wherein the display device is comprised of a display surface directed to a downward side, further comprising:
a reflection member provided closer to the vehicle-rearward side than the decoration member and reflecting the image displayed on the display surface toward the vehicle-rearward side and passing therethrough a light that comes from the front side of the motor vehicle; and
a light-emitting section that illuminates the decoration member at a position closer to the front side of the motor vehicle than the reflection member.

9. The display apparatus for motor vehicle according to claim 8, further comprising a controller that switches between a light state where the decoration member is made visible and a dark state where the decoration member is made invisible by switching the light-emitting section in accordance with the image displayed by the display device.

10. The display apparatus for motor vehicle according to claim 2, wherein the decoration member is configured to be moveable in parallel to a width direction of the motor vehicle.

11. The display apparatus for motor vehicle according to claim 2, wherein the decoration member is annularly formed so as to surround at least a part of the image displayed and made visible by the display device.

12. The display apparatus for motor vehicle according to claim 1, wherein the front face part is configured to be tilted with the tilt angle same as a tilt angle with respect to the vertical direction expressed by the stereoscopic image.

13. The display apparatus for motor vehicle according to claim 12, wherein the display device is arranged closer to the front side of the motor vehicle than the decoration member and is comprised of a display surface facing the vehicle-rearward side.

14. The display apparatus for motor vehicle according to claim 12, wherein the display device is comprised of a display surface directed to a downward side, further comprising:
a reflection member provided closer to the vehicle-rearward side than the decoration member and reflecting the image displayed on the display surface toward the vehicle-rearward side and passing therethrough a light that comes from the front side of the motor vehicle; and
a light-emitting section that illuminates the decoration member at a position closer to the front side of the motor vehicle than the reflection member.

15. The display apparatus for motor vehicle according to claim 14, further comprising a controller that switches between a light state where the decoration member is made visible and a dark state where the decoration member is made invisible by switching the light-emitting section in accordance with the image displayed by the display device.

16. The display apparatus for motor vehicle according to of claim 1, wherein the display device is arranged closer to the front side of the motor vehicle than the decoration member and is comprised of a display surface facing the vehicle-rearward side.

17. The display apparatus for motor vehicle according to claim 1, wherein the display device is comprised of a display surface directed to a downward side, further comprising:

a reflection member provided closer to the vehicle-rearward side than the decoration member and reflecting the image displayed on the display surface toward the vehicle-rearward side and passing therethrough a light that comes from the front side of the motor vehicle; and a light-emitting section that illuminates the decoration member at a position closer to the front side of the motor vehicle than the reflection member.

18. The display apparatus for motor vehicle according to claim 17, further comprising a controller that switches between a light state where the decoration member is made visible and a dark state where the decoration member is made invisible by switching the light-emitting section in accordance with the image displayed by the display device.

19. The display apparatus for motor vehicle according to claim 1, wherein the decoration member is configured to be moveable in parallel to a width direction of the motor vehicle.

20. The display apparatus for motor vehicle according to claim 1, wherein the decoration member is annularly formed so as to surround at least a part of the image displayed and made visible by the display device.

* * * * *